(12) United States Patent
Wolf et al.

(10) Patent No.: US 7,937,937 B2
(45) Date of Patent: May 10, 2011

(54) TURBINE AND PUMP SHELLS FOR TORQUE CONVERTERS AND METHODS OF MANUFACTURING

(75) Inventors: Herbert Wolf, Wooster, OH (US); David Brucato, Ashland, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 627 days.

(21) Appl. No.: 12/001,164

(22) Filed: Dec. 10, 2007

(65) Prior Publication Data
US 2008/0148724 A1 Jun. 26, 2008

Related U.S. Application Data

(60) Provisional application No. 60/876,215, filed on Dec. 21, 2006.

(51) Int. Cl.
*F16D 33/00* (2006.01)
(52) U.S. Cl. .......................................................... 60/330
(58) Field of Classification Search ...................... 60/330
See application file for complete search history.

(56) References Cited

U.S. PATENT DOCUMENTS

| 5,868,025 | A | 2/1999 | Fukuda et al. |
| 5,946,962 | A | 9/1999 | Fukuda et al. |
| 6,024,538 | A | 2/2000 | Tanishiki et al. |
| 2004/0107698 | A1* | 6/2004 | Schleicher et al. ............. 60/330 |
| 2004/0250594 | A1 | 12/2004 | Schwenk |

* cited by examiner

*Primary Examiner* — F. Daniel Lopez
(74) *Attorney, Agent, or Firm* — Simpson & Simpson, PLLC (57) ABSTRACT

A blade with first and second blade tabs extending outwardly from an edge of the blade; and a shell with a first indent and a first slot. The first blade tab is arranged to engage the first indent and the second blade tab is arranged to engage the first slot. In one embodiment, the first indent is arranged radially inward on the shell relative to the first slot. In one embodiment, the first blade tab is affixed to the first indent. In one embodiment, the second blade tab is bent over an outside surface of the turbine shell. In one embodiment, the shell includes a second indent and the blade includes a third blade tab extending outwardly from the edge and at least partially disposed in the second indent. A method of manufacturing a pump or turbine shell for a torque converter.

12 Claims, 12 Drawing Sheets

TURBINE AND PUMP SHELLS FOR TORQUE CONVERTERS AND METHODS OF MANUFACTURING

CROSS-REFERENCE TO RELATED APPLICATIONS

This application claims the benefit under 35 U.S.C. §119(e) of U.S. Provisional Application No. 60/876,215, filed Dec. 21, 2006.

FIELD OF THE INVENTION

The invention relates generally to torque converters, and more specifically, to components for torque converters, namely turbine and pump shells having blades attached by means of blade tabs, and to methods of manufacturing.

BACKGROUND OF THE INVENTION

Figure 1:
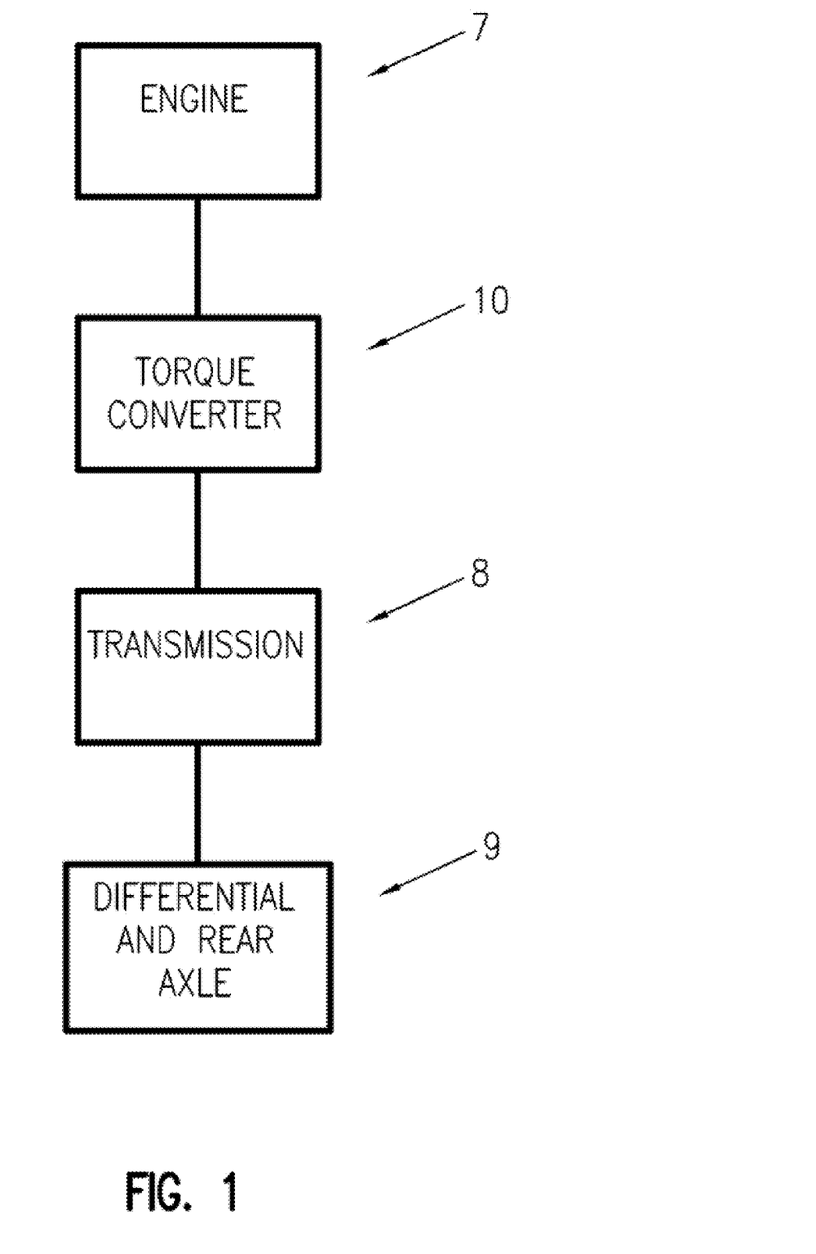
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
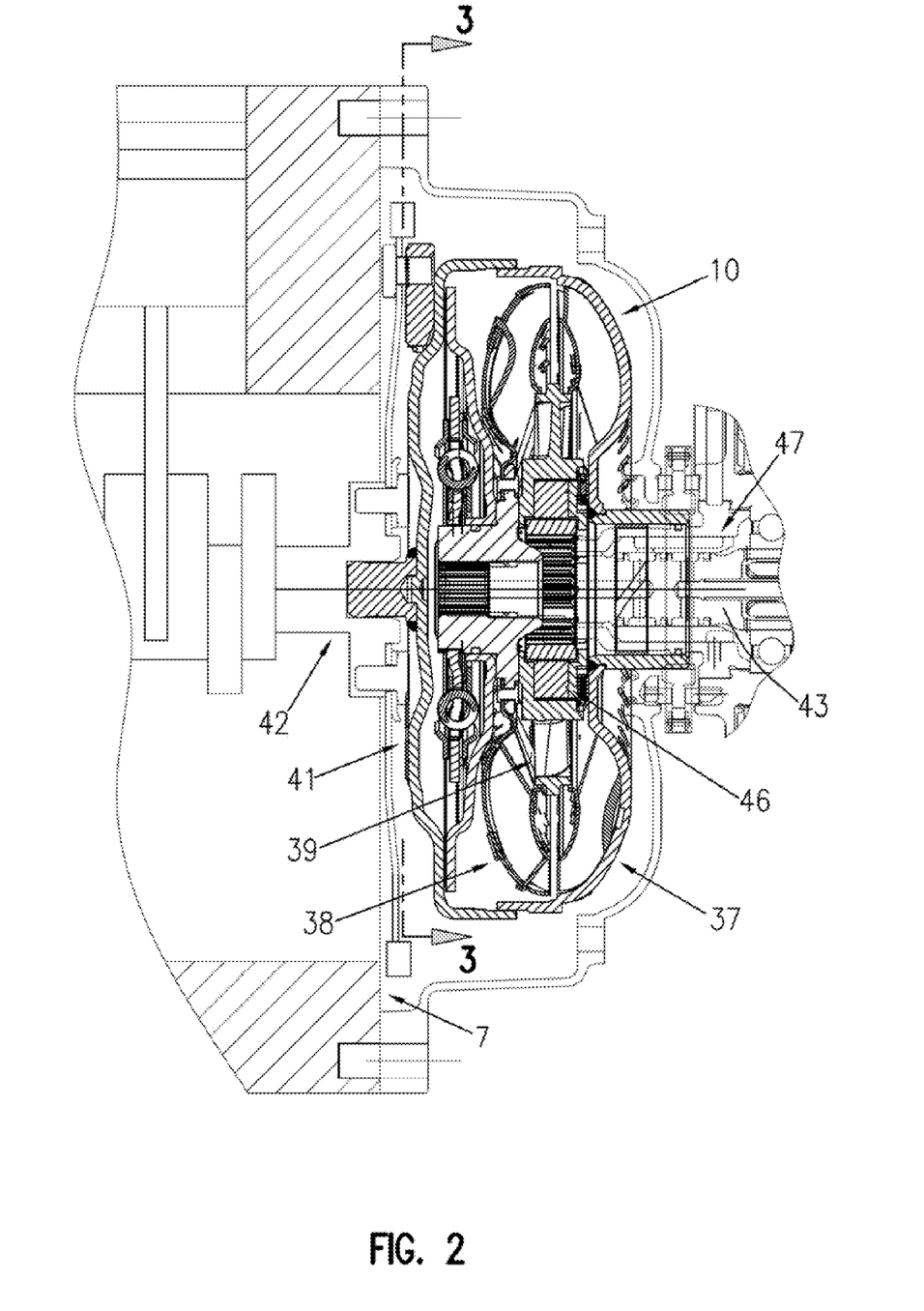
FIG. 2 is a cross-sectional view of a prior art torque converter, shown secured to an engine of a motor vehicle.
Figure 3:
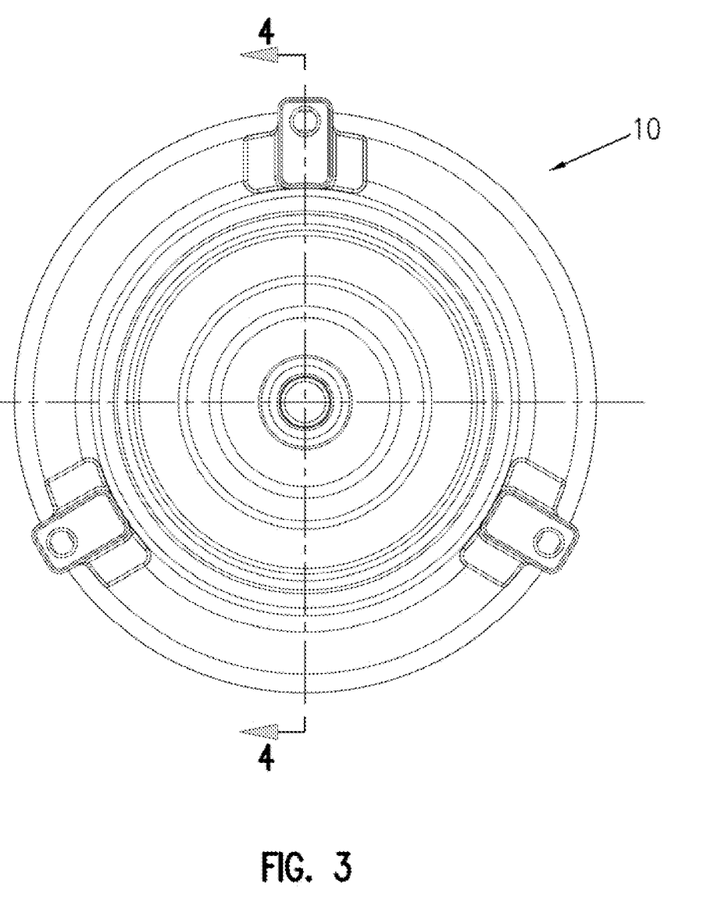
FIG. 3 is a left view of the torque converter shown in FIG. 2, taken generally along line 3-3 in FIG. 2.
Figure 4:
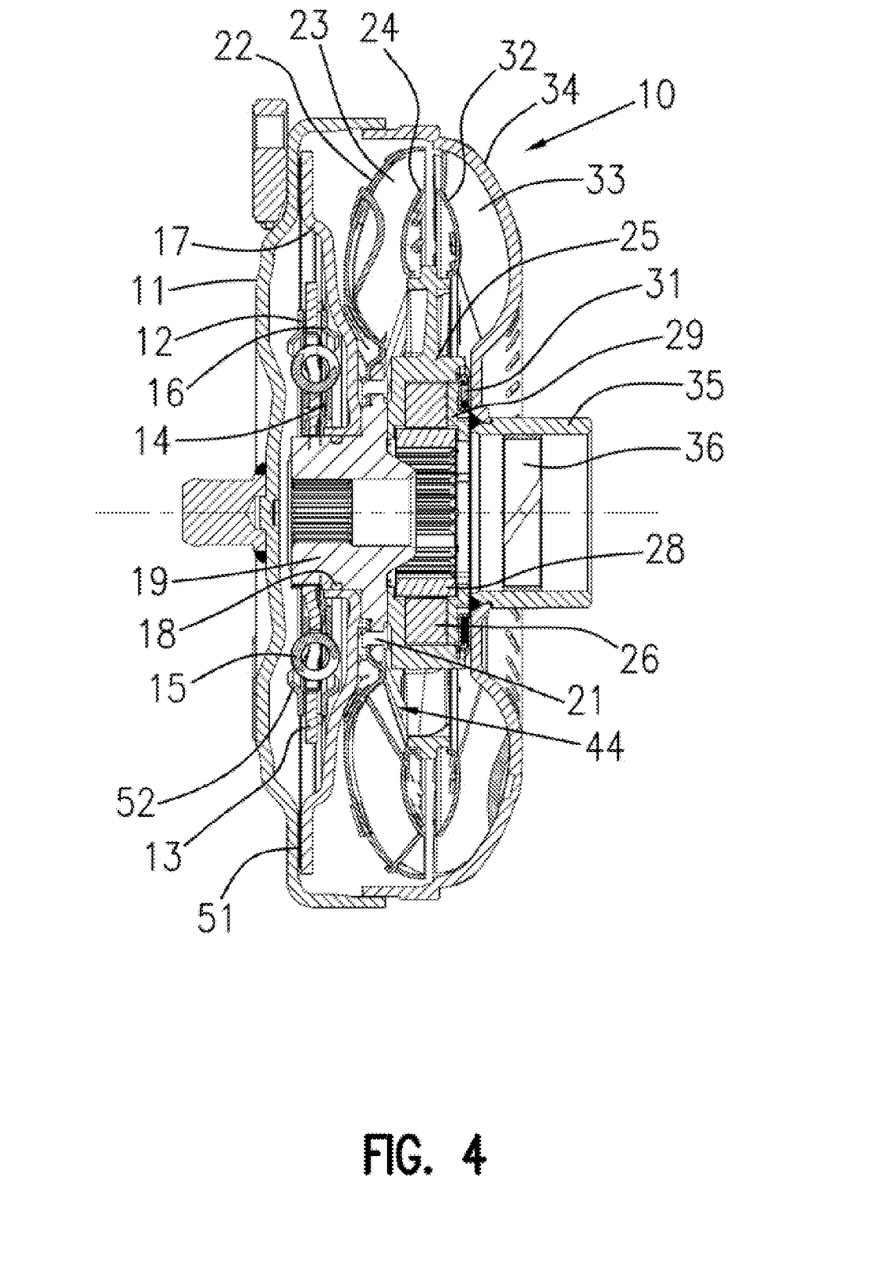
FIG. 4 is a cross-sectional view of the torque converter shown in FIGS. 2 and 3, taken generally along line 4-4 in FIG. 3.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Turbine shell 22 and pump shell 34 comprise a plurality of slots arranged to engage with turbine blades 23 and pump blades 33, respectively. Each turbine blade and pump blade comprises a blade tab arranged to engage each slot in the turbine or pump shell. The blades are then secured to the shells by an attachment means. Conventionally, the blade tabs are bent once they protrude through the shell. The blades are then usually brazed to strengthen the connection.

In manufacturing the turbine shell and pump shell, manufacturers commonly start with a flat piece of material that is cut in a circular shape. The slots are then punched or cut into the shells in any arrangement suited to engage the blade tabs. The shells are then stamped (or similarly formed) into the semi-toroidal shapes seen most clearly in FIGS. 5 and 6. Such a forming process is disclosed in U.S. Pat. No. 5,868,025 (Fukuda et al.). This forming process deforms the slots and can result in misaligned blades and blade tabs. Thus, the prior art is not able to form a slot shape and width such that their dimensions after the final stamping/forming process are within acceptable tolerance limits to engage with the blades and blade tabs. The largest amount of deformation of the slots occurs in the slots most radially centered. That is, the slots closest to the axis of rotation are most affected by slot deformation during the final stamping process.

Misaligned blade tabs result in poor attachment of a blade to a shell. Poorly attached blades can easily break away from the shell when the torque converter is in use. Thus, misaligned structures are usually scrapped.

To overcome the extent of deformation and scrapped structures, some manufacturers have simultaneously cut slits into the shell and punched the shell into the semi-toroidal shape such as described in U.S. Pat. No. 5,946,962 (Fokuda et al.). However, this process requires a very precise level of control in order to assure slot deformation is within acceptable limits to produce the desired slot widths and shapes.

The brazing process that conventionally follows the above processes includes adding a brazing paste to the blade tabs prior to inserting the blade tabs into the shell slots, and then passing the assembly of shell and blades through a furnace. This is most commonly done using a furnace conveyor belt. The position and level of deformation of the slots can lead to brazing paste leaking through the slots and depositing atop the furnace belt. The deposition of brazing paste leads to delays in factory processes and can result in furnace malfunction.

A method of drastically reducing blade tab attachment deformation is to form indentations arranged to engage blade tabs in lieu of slots. Indents deform much less than slots, especially in the inner radial sections of the shells. A method of forming these indentations by means of stamping or pressing is disclosed in commonly owned U.S. Patent Application No. 2004/0250594 (Schwenk), which is incorporated by reference herein. However, blade tabs for indents are usually smaller in overall dimensions than blade tabs for slots to accommodate the smaller size of the indents. Because the blade tabs for indents do not structurally hold the blades in place against the shell, it is often difficult and not cost effective to only use indents to arrange a plurality of blades against a shell and braze or weld the blades into place. Conventionally, a separate structure is introduced to the blade and shell assembly that is opposite the shell and holds the blade tabs in their respective indents in the shell, so that the blade tabs can be brazed to their respective indentations. However, this process is prone to failure inadequate alignment between blade tabs and indentations.

Accordingly, there is a need for an improved blade attachment means that greatly reduces the blade tab misalignment and increases manufacturability.

BRIEF SUMMARY OF THE INVENTION

The invention broadly comprises a shell assembly for a torque converter including: a blade with first and second blade tabs extending outwardly from an edge of the blade; and a shell with a first indent and a first slot. The first blade tab is arranged to engage the first indent and the second blade tab is arranged to engage the first slot. In one embodiment, the first indent is arranged radially inward on the shell relative to the first slot. In one embodiment, the first blade tab is affixed to the first indent. In one embodiment, the second blade tab is bent over an outside surface of the turbine shell. In one embodiment, the shell includes a second indent and the blade includes a third blade tab extending outwardly from the edge and at least partially disposed in the second indent.

In one embodiment, the shell includes a second slot and the blade includes a third blade tab extending outwardly from the edge and at least partially disposed in the second slot. In one embodiment, the shell assembly includes a plurality of blades, each blade includes the first and second blade tabs, the shell includes respective pluralities of indents and slots in respective concentric rows, and for each blade, the first and second blade tabs are engaged with the respective pluralities of indents and slots, respectively. In one embodiment, the shell is a turbine shell or a pump shell.

The invention also broadly comprises a shell for a torque converter including: a first indent arranged to receive a first blade tab for a blade; and a first slot arranged to receive a second blade tab for the blade. In one embodiment, said first indent is arranged radially inward on said shell relative to said first slot. In one embodiment, said first blade tab is arranged to be affixed to said first indent. In one embodiment, said second blade tab is arranged to be bent over an outside surface of the shell. In one embodiment, the shell includes a second indent and the blade includes a third blade tab arranged to be at least partially disposed in the second indent. In one embodiment, the shell includes a second slot and the blade includes a third blade tab arranged to be at least partially disposed in the second slot. In one embodiment, the shell includes respective pluralities of indents and slots in respective concentric rows arranged to engage respective first and second tabs from a plurality of blades. The shell can be a turbine shell or a pump shell.

The invention broadly comprises a method of manufacturing a pump or turbine shell for a torque converter including the steps of: forming a circular row of indents into a circular disk; forming a first circular row of slots into the circular disk; forming the circular disk into a shell with a semi-toroidal shape; for each blade in a plurality of blades, inserting a first blade tab into a respective indent in the plurality of indents and inserting a second blade tab into a respective slot in the first row of slots; bending the second blade tab onto the shell, and affixing the first blade tab to the shell. In one embodiment, the steps of forming a circular row of indents into a circular disk and forming a first circular row of slots into the circular disk are performed substantially simultaneously.

In one embodiment, the steps of forming a circular row of indents into a circular disk and forming a first circular row of slots into the circular disk and the step of forming the circular disk into a shell with a semi-toroidal shape are performed sequentially. In one embodiment, the steps of forming a circular row of indents into a circular disk, forming a first circular row of slots into the circular disk, and forming the circular disk into a shell with a semi-toroidal shape are performed substantially simultaneously. In one embodiment, the row of radial indents is displaced radially inwards with respect to the first row of radial slots. In one embodiment, the method includes: forming a second circular row of slots into the circular disk; for each blade in the plurality of blades, inserting a third blade tab into a respective slot in the second row of slots; and bending the third blade tab onto the shell.

It is a general object of the present invention to provide a means for attaching a blade to a shell of a torque converter, by affixing a blade to the shell by both a bent tab and a tab resting in an indent in the shell that is brazed, welded or similarly affixed.

It is also a general object of the present invention to provide a method of manufacturing a pump or turbine shell for a torque converter by forming at least one row of radial indents into a circular disk, forming at least one row of radial slots into the circular disk, and forming the circular disk into a shell with a semi-toroidal shape.

It is a further objective of the present invention to improve manufacturability and limit waste in the manufacturing of turbine and pump shell and blade assemblies, by reducing blade tab misalignment and leakage during brazing.

Other objects, features, and advantages of the invention will be apparent from the drawings, specification and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments. In the description below, the terms "top", "bottom", "upper", "lower", "front", "back", "rear", "left", "right", and their derivatives, should be interpreted from the perspective of one viewing the invention shown in FIG. 1.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
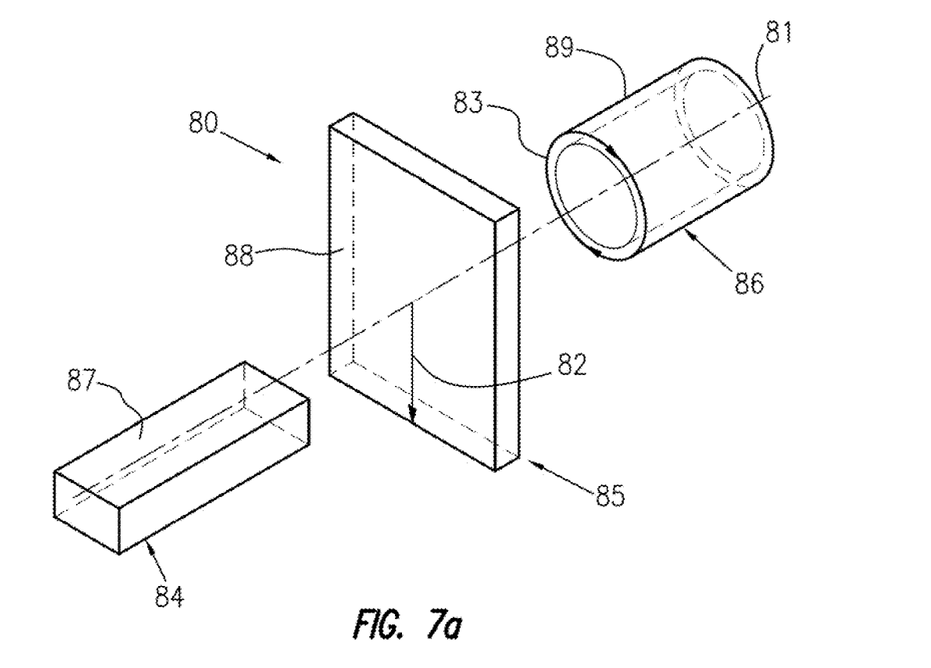
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
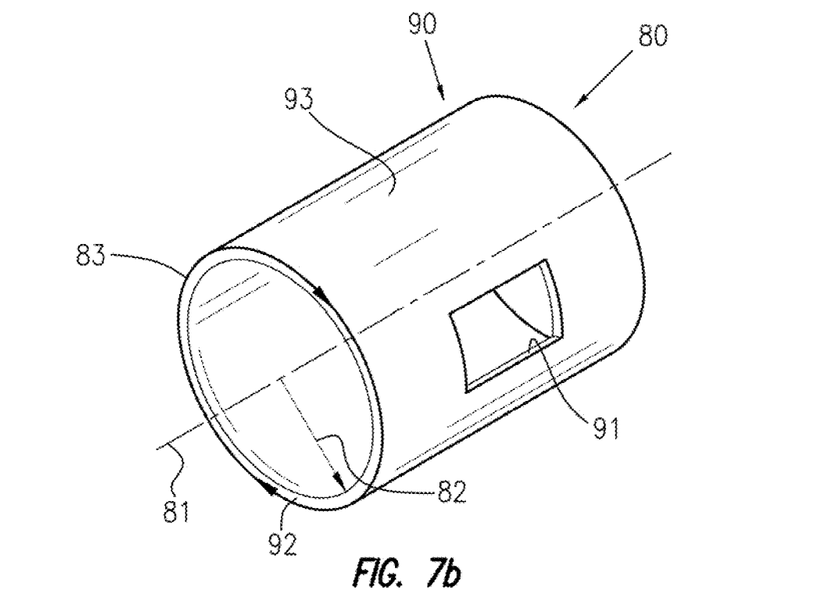
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 8:
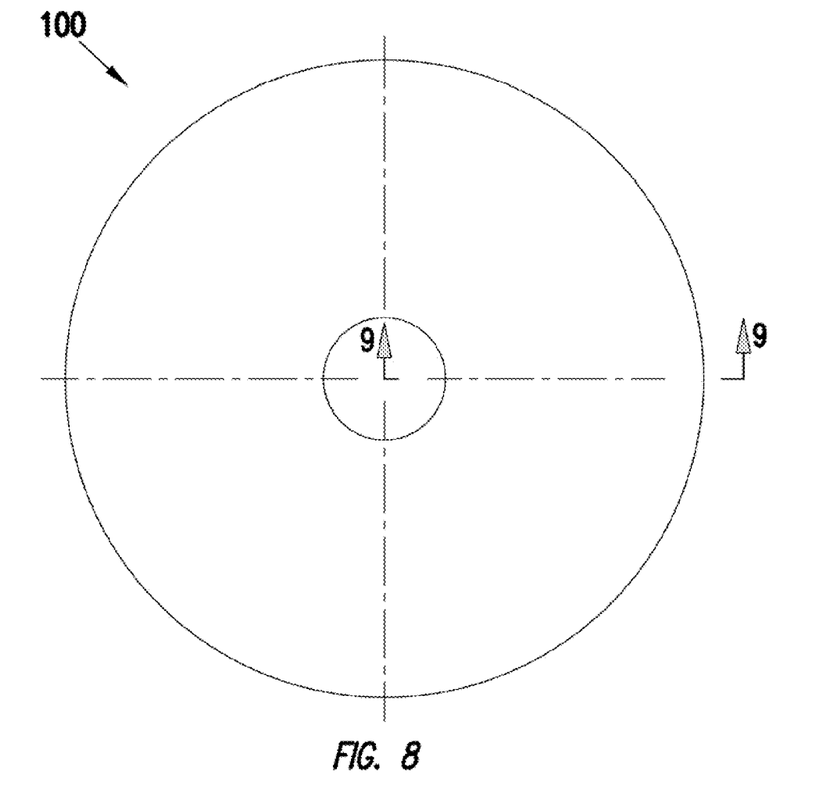
FIG. 8 is a top view of an unprocessed circular shell to be formed into a shell for a torque converter.

FIG. 8 is a top view of shell 100 prior to any forming or processing. Shell 100 is essentially a disk of circular shape having a hole in the center. The structures and forming process recited below will form shell 100 into a shell having a blade attachment means according to the present invention.

Figure 9:
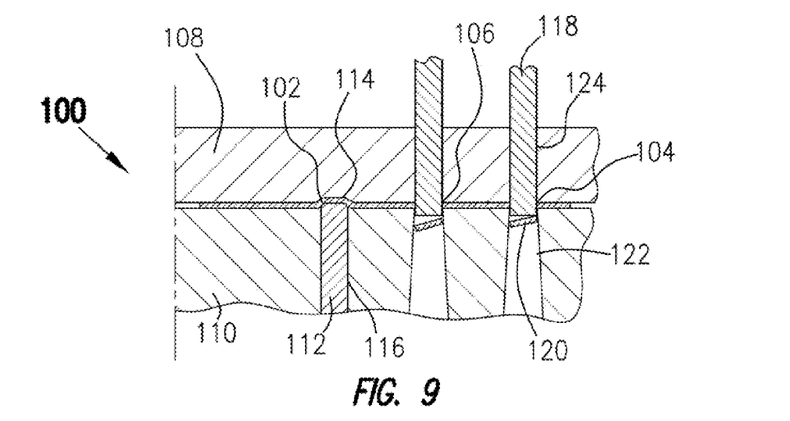
FIG. 9 is a partial cross-sectional view of the shell shown in FIG. 8, taken generally along line 9-9 in FIG. 8 during the slot and indent forming process.

FIG. 9 is a partial cross-sectional view of shell 100 taken generally along line 9-9 in FIG. 8 during the slot and indent forming process. In this forming process, at least first indent 102 and at least first slot 104 are formed into shell 100. Preferably, indent 102 is formed radially inwards, closer to the center of shell 100, in shell 100 respective to first slot 104. In this preferred embodiment comprising first indent 102 and first slot 104, shell 100 further includes second slot 106. It should be appreciated, however, that second slot 106 could be replaced by a second indent. It should also be appreciated that any number, combination, or configuration of slots and indents is included in the spirit and scope of the claimed invention. The invention is in no way limited to only the configuration of first indent slot 102 and first shell slot 104.

First shell indent 102 is formed by holding shell 100 between upper punch plate 108 and lower punch plate 110, and forming indent 102 with indent stamp 112. Upper punch plate 108 includes indent guide 114 to allow shell 100 to deform and create indent 102, and lower punch plate 110 includes indent stamp guide 116 which enable indent stamp 112 to move up and down. First shell slot 104 is formed by punching slot punch 118 through shell 100 and removing blank 120 through first slot opening 122 of lower punch plate 110. Slot punch 118 travels through upper punch plate 108 through first slot punch guide 124. Second shell slot 106 is formed through means similar to that of first shell slot 104.

Figure 10:
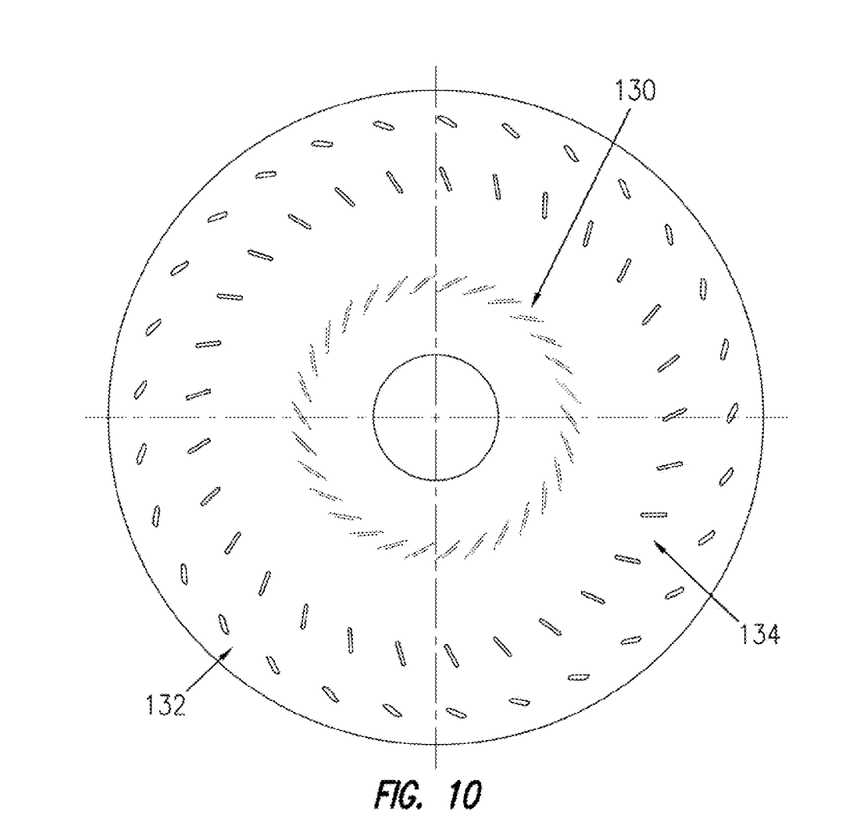
FIG. 10 is a top view of the shell shown in FIG. 8 after the slot and indent forming process has been completed.
Figure 16:
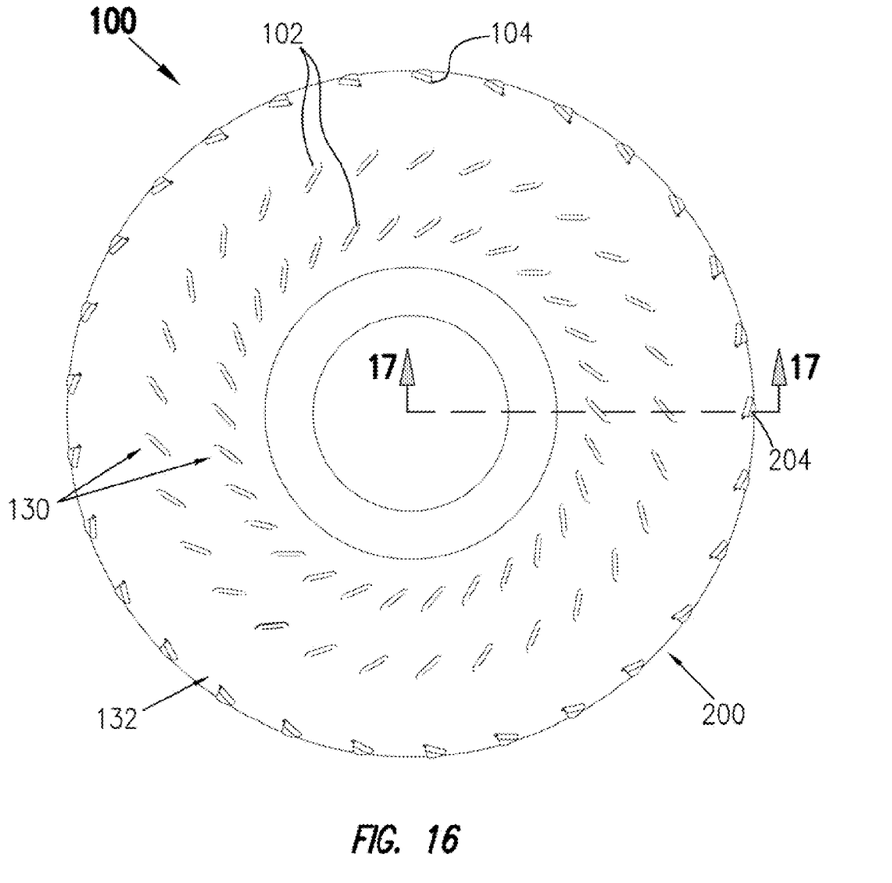
FIG. 16 is a top view of a shell having two pluralities of indents; and, FIG. 17 is a partial cross-sectional view of the shell shown in FIG. 16 taken generally along line 17-17 in FIG. 16.
Figure 17:
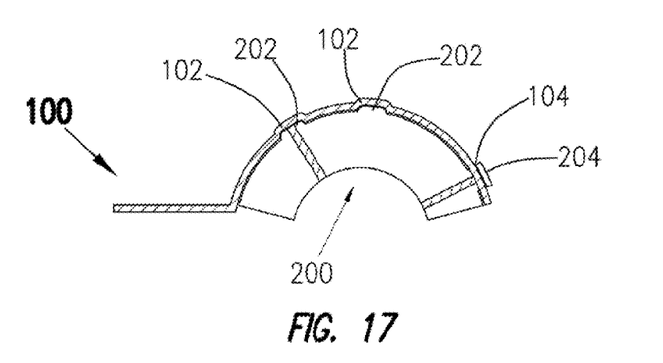

In one embodiment, the process shown in FIG. 9 is simultaneously completed, across the entirety of shell 100, producing a plurality of rows of concentric, circumferentially spaced slots and indents. This is shown in FIG. 10, which is a top view of the shell shown in FIG. 8 after the slot and indent forming process has been completed. Shell 100, as shown in FIG. 10, shows three concentric rows of circumferentially spaced indents and slots, namely indent row 130 and slots rows 132 and 134. In one embodiment, row 134 can be a row of indents instead of a row of slots as shown in FIGS. 16 and 17.

Figure 5:
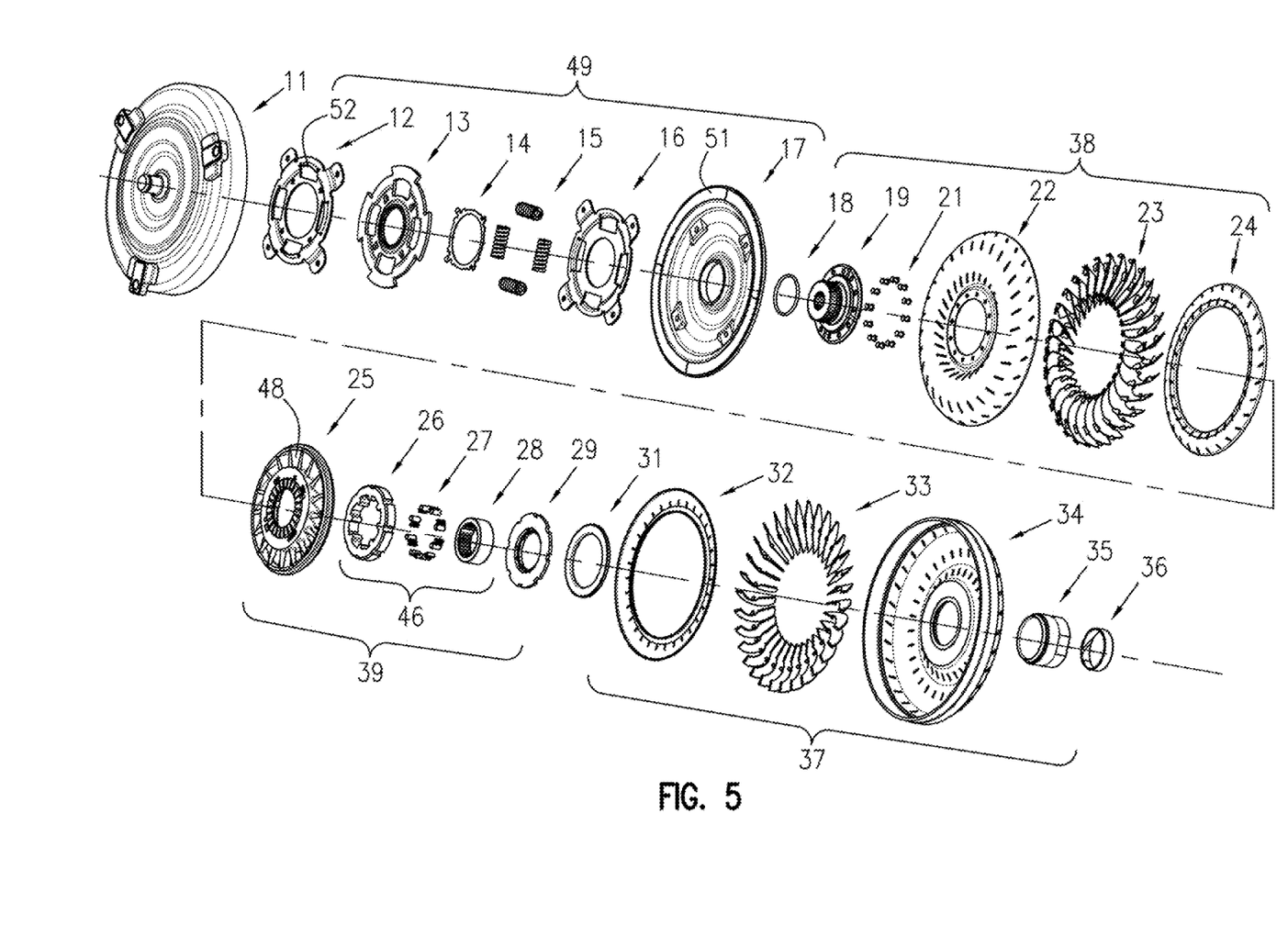
FIG. 5 is a first exploded view of the torque converter shown in FIG. 2, as shown from the perspective of one viewing the exploded torque converter from the left.
Figure 6:
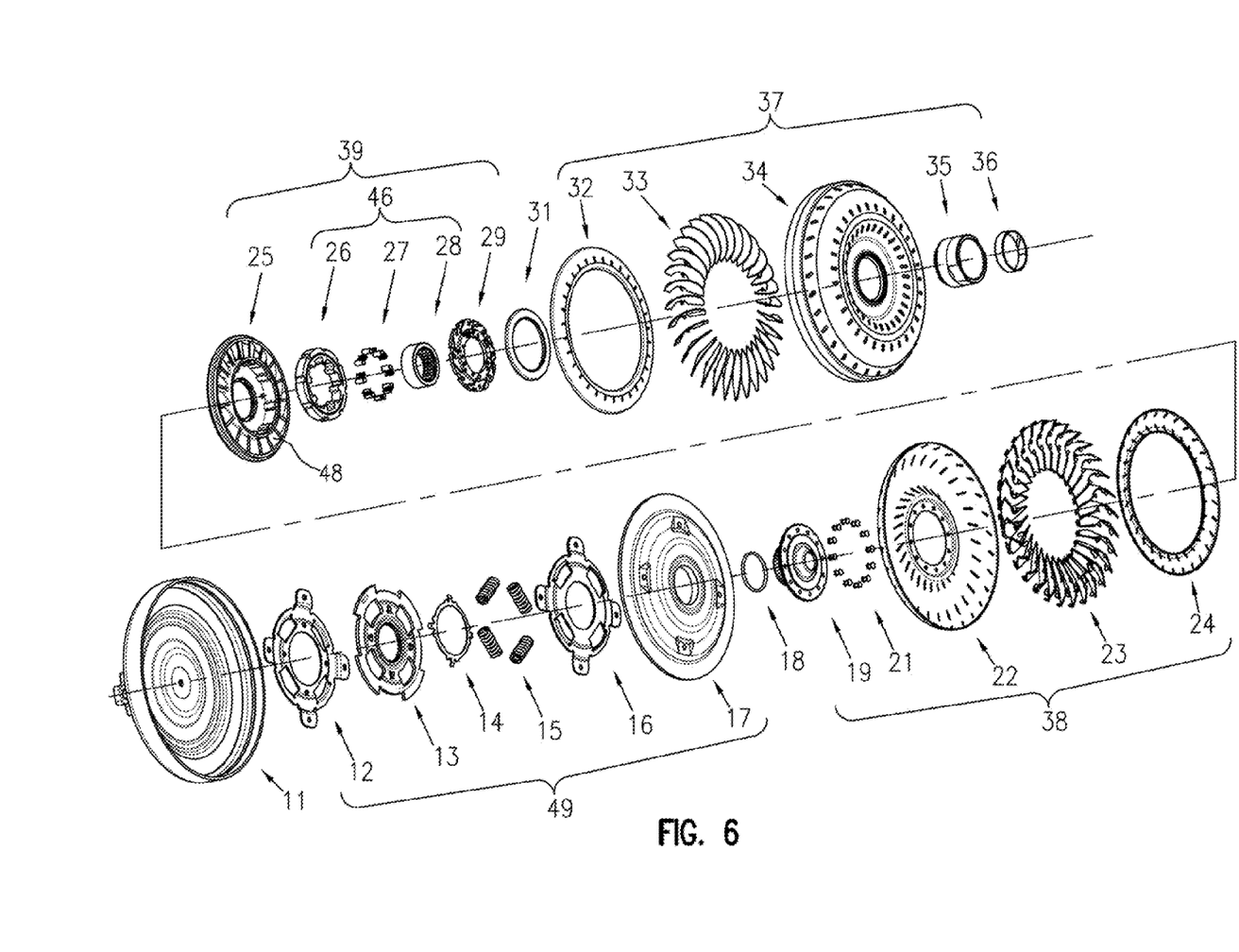
FIG. 6 is a second exploded view of the torque converter shown in FIG. 2, as shown from the perspective of one viewing the exploded torque converter from the right.
Figure 11:
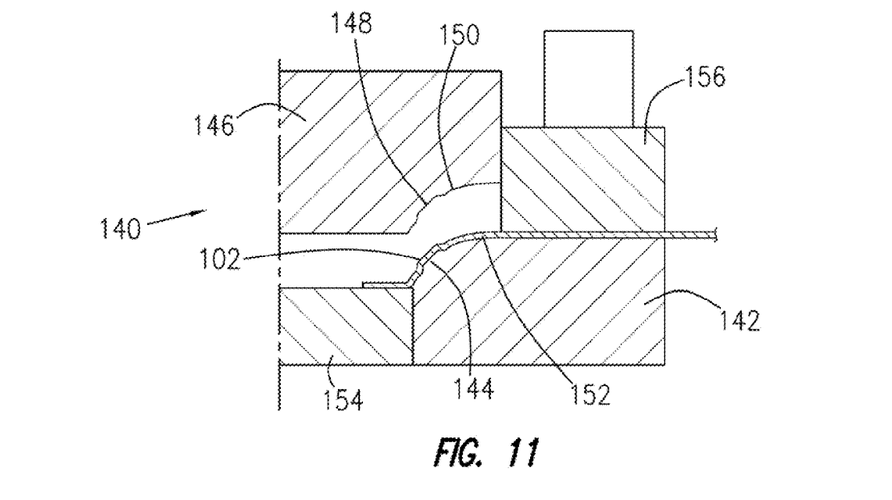
FIG. 11 is a partial cross-sectional view of the shell shown in shown in FIG. 9 during a first forming process to create a semi-toroidal shape.

Shells in torque converters have a semi-toroidal shape as seen in shells in 22 and 34 of FIG. 5 for example. Care must be taken in forming shell 100 into a semi-toroidal shape in order to maintain the structure of indent 102. As shown in FIG. 11, a partial cross-sectional view of shell 100 shown in FIG. 9 during a first forming process to create a semi-toroidal shape, shell 100 can be placed in forming apparatus 140. Apparatus 140 includes forming block 142 which includes ridge 144 for maintaining the shape and alignment of indent 102 during the forming process when shell 100 is engaged between block 142 and block 146. Block 146 includes indent guide 148 to accommodate the shape of indent 102 as well as curved surface 150 for engagement with curved surface 152 of block 142. By engaging blocks 142, 144, 154 and 156 a partial semi-toroidal shape can be formed.

Figure 12:
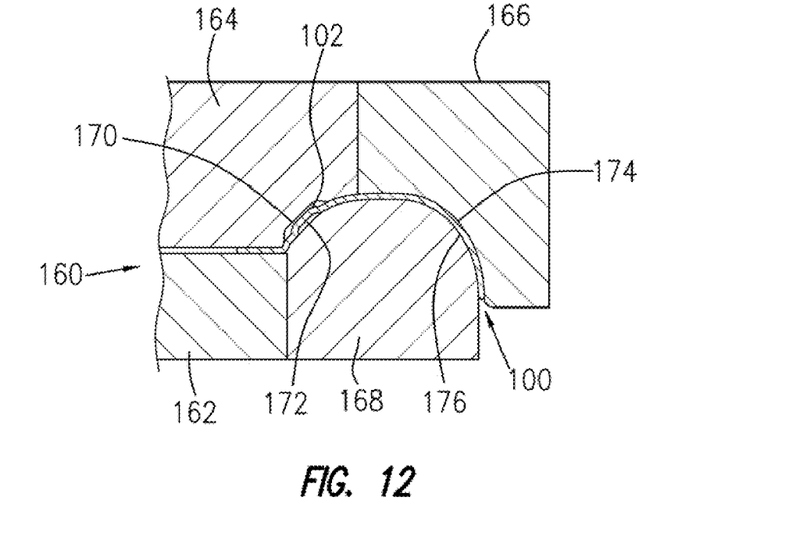
FIG. 12 is a partial cross-sectional view of the shell shown in shown in FIG. 11 during a second forming process to create a semi-toroidal shape.

To complete the semi-toroidal shape, a second forming process is preferably completed as shown in FIG. 12, a partial cross-sectional view of shell 100 shown in FIG. 11 during the second forming process. Shell 100 is further formed into a semi-toroidal shape in apparatus 160, comprising blocks 162, 164, 166 and 168. Block 164 includes indent guide 170 and block 168 includes ridge 172 to accommodate the shape of indent 102. Surface 174 of block 166 and surface 176 of block 168 engage with shell 100 to complete the semi-toroidal shape.

It should be appreciated that the forming process recited above and shown in FIGS. 11 and 12 can be accomplished in one simultaneous forming process. However, two separate processes are preferred due to deformation limitations in such forming processes.

Figure 13:
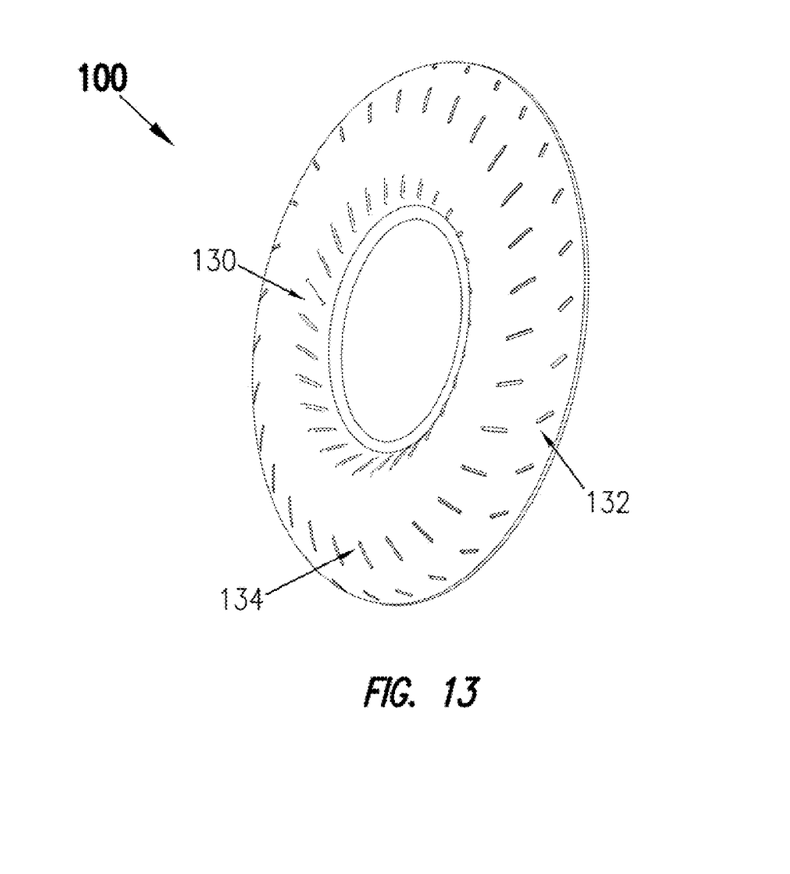
FIG. 13 is a perspective view from the front of the finished shell for a torque converter after the second forming process is completed.
Figure 14:
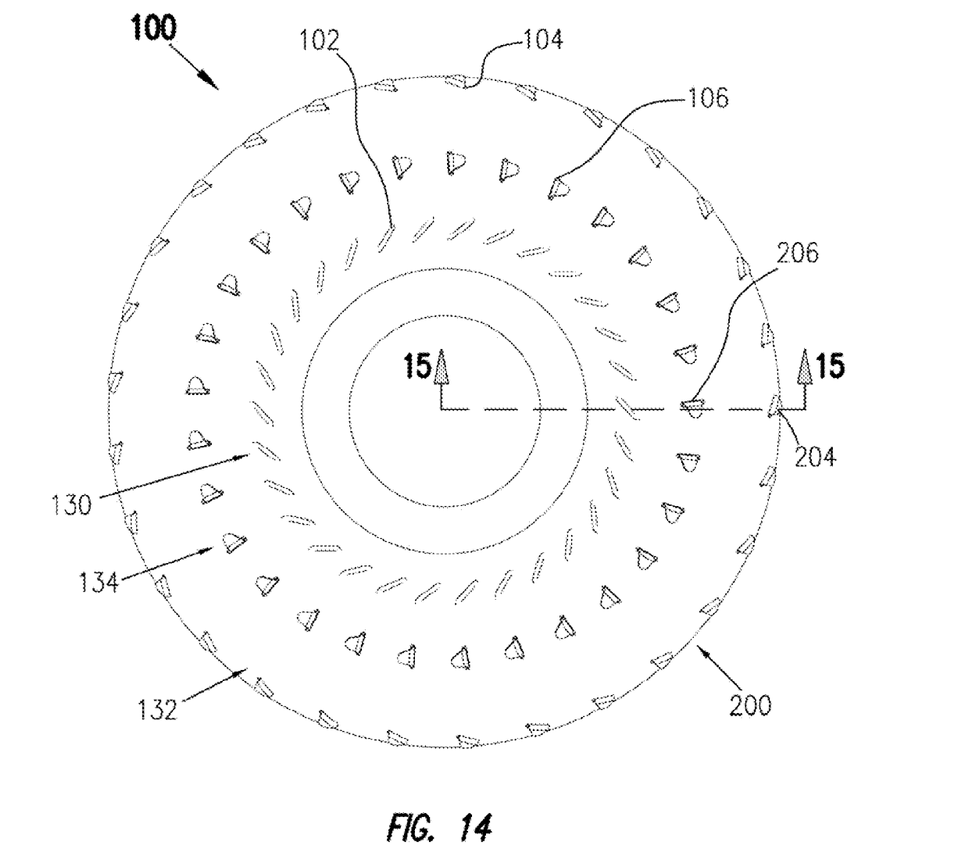
FIG. 14 is a top view of the shell shown in FIG. 13 having blades attached to the shell.

After the second forming process shown in FIG. 12 is completed, the shell has a semi-toroidal shape as shown in FIG. 13, which is a perspective view from the front of shell 100. FIG. 14 is a top view of a shell for a torque converter (not shown) having blades 200 attached to shell 100, through bent tabs 204 and 206. The attachment means between blades 200 and shell 100 is more clearly shown in FIG. 15, which is a partial cross-sectional view of shell 100 shown in FIG. 14 taken generally along line 15-15 in FIG. 14.

Figure 15:
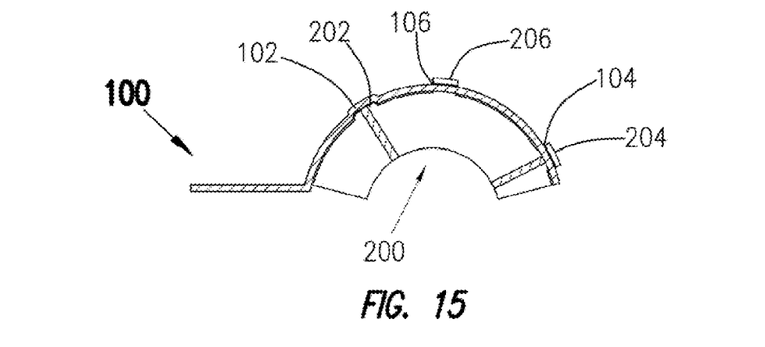
FIG. 15 is a partial cross-sectional view of the shell shown in FIG. 14 taken generally along line 15-15 in FIG. 14.

Blade 200 include blade tab 202 extending outwardly from blade 200 and arranged to engage shell indent 102, blade tab 204 extending outwardly from blade 200 and arranged to engage shell slot 104, and blade tab 206 extending outwardly from blade 200 and arranged to engage shell slot 106. It should be readily appreciated that shell blade tab 206 could also be arranged to engage a shell indent instead of shell slot 106. Blade tab 202 and shell indent 102 are arranged radially inwards on shell 100 relative to second blade tab 204 and first shell slot 202.

To further secure blades 200 to shell 100, blade tabs 204 and 206 are preferably bent onto shell 100 as is most clearly shown in FIG. 14. Blades 200 can be fixed to the shell by any means known in the art, including, but not limited to, brazing, welding, embossing, soldering, pressure fitting, snap-fitting, ultra-sonic welding or laser welding. In a preferred embodiment, blades 200 are brazed to shell 100.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

We claim:

1. A shell assembly for a torque converter comprising:
a blade with first, second, and third blade tabs extending outwardly from an edge of said blade; and,
a shell with first and second indents and a first slot, wherein said first and second blade tabs are arranged to engage said first and second indents, respectively, and said third blade tab is arranged to engage said first slot.

2. The shell assembly recited in claim 1, wherein said first indent is arranged radially inward on said shell relative to said first slot.

3. The shell assembly recited in claim 1, wherein said first blade tab is affixed to said first indent.

4. The shell assembly recited in claim 1, wherein said third blade tab is bent over an outside surface of the shell.

5. The shell assembly recited in claim 1, further comprising a plurality of blades, wherein each blade includes the first, second, and third blade tabs, wherein the shell includes respective pluralities of indents and slots in respective concentric rows, and wherein for said each blade, the first, second, and third blade tabs are engaged with said respective pluralities of indents and slots, respectively.

6. The shell assembly recited in claim 1, wherein the shell is selected from the group consisting of a turbine shell and a pump shell.

7. A shell for a torque converter comprising:
first and second indents arranged to receive first and second blade tabs, respectively, for a blade; and,
a first slot arranged to receive a third blade tab for the blade.

8. The shell recited in claim 7, wherein said first indent is arranged radially inward on said shell relative to said first slot.

9. The shell recited in claim 7, wherein said first blade tab is arranged to be affixed to said first indent.

10. The shell recited in claim 7, wherein said third blade tab is arranged to be bent over an outside surface of the shell.

11. The shell recited in claim 7, further including respective pluralities of indents and slots in respective concentric rows arranged to engage respective first, second, and third tabs from a plurality of blades.

12. The shell assembly recited in claim 7, wherein the shell is selected from the group consisting of a turbine shell and a pump shell.

* * * * *